United States Patent
Sridhar et al.

(10) Patent No.: US 9,603,047 B2
(45) Date of Patent: Mar. 21, 2017

(54) LOAD BALANCING BASED ON AN AGGREGATE QUALITY OF SERVICE FOR APPLICATIONS USING A CARRIER FOR WIRELESS COMMUNICATION

(71) Applicants: Alcatel-Lucent USA Inc., Murray Hill, NJ (US); Alcatel-Lucent Canada Inc., Ottawa (CA)

(72) Inventors: Kamakshi Sridhar, Plano, TX (US); Jonathan D. Segel, Ottawa (CA)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 35 days.

(21) Appl. No.: 14/524,323

(22) Filed: Oct. 27, 2014

(65) Prior Publication Data

US 2016/0119813 A1   Apr. 28, 2016

(51) Int. Cl.
| | |
|---|---|
| *H04W 28/08* | (2009.01) |
| *H04W 28/02* | (2009.01) |
| *H04W 84/04* | (2009.01) |

(52) U.S. Cl.
CPC ....... *H04W 28/0268* (2013.01); *H04W 28/08* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 6,459,902 | B1* | 10/2002 | Li | H04Q 3/0091 379/112.03 |
| 7,031,266 | B1* | 4/2006 | Patel | H04L 45/02 370/254 |
| 2002/0124106 | A1* | 9/2002 | Dolganow | H04L 12/5695 709/242 |
| 2007/0218913 | A1* | 9/2007 | Chen | H04W 72/10 455/450 |
| 2008/0049650 | A1* | 2/2008 | Coppage | H04W 24/08 370/310 |
| 2011/0170518 | A1* | 7/2011 | Randriamasy | H04W 36/20 370/331 |
| 2012/0236712 | A1* | 9/2012 | Park | H04W 36/22 370/230 |
| 2013/0028093 | A1* | 1/2013 | Cho | H04W 28/08 370/236 |
| 2014/0211698 | A1* | 7/2014 | Aguirre | H04W 28/085 370/329 |
| 2015/0009826 | A1* | 1/2015 | Ma | H04W 28/0268 370/235 |

OTHER PUBLICATIONS

"Evolved Universal Terrestrial Radio Access (E-UTRA) and Evolved Universal Terrestrial Radio Access Network (E-UTRAN)", 3GPP TS 36.300 Version 9.4.0 Release 9, Jun. 18, 2010, pp. 99, 105, and 155-158.

* cited by examiner

*Primary Examiner* — Sulaiman Nooristany
(74) *Attorney, Agent, or Firm* — Davidson Sheehan LLP

(57) ABSTRACT

A load threshold for a first carrier of a base station is set based on quality of service (QoS) classes for applications using the first carrier. Load balancing between the first carrier and one or more second carriers is performed based on the load threshold.

19 Claims, 5 Drawing Sheets

LOAD BALANCING BASED ON AN AGGREGATE QUALITY OF SERVICE FOR APPLICATIONS USING A CARRIER FOR WIRELESS COMMUNICATION

BACKGROUND

Field of the Disclosure

The present disclosure relates generally to wireless communication systems and, more particularly, to managing loads on a wireless communication system.

Description of the Related Art

Congestion in wireless communication systems reduces the user quality of experience and increases the probability of dropped calls. A carrier of an eNodeB can become congested if too many instances of active user equipment are attempting to communicate with the eNodeB over the carrier. The wireless communication system may therefore load balance some of the active user equipment away from the heavily loaded carrier to a more lightly loaded carrier to reduce congestion on the heavily loaded carrier and thereby improve the quality of experience of the active user equipment. An eNodeB can monitor the load on a carrier and send requests to user equipment to measure the signal strength of other potential carriers if the load on the carrier exceeds a load threshold. In response to the request from the eNodeB, a user equipment enters the compressed measurement mode and suspends communication on its current carrier for a short time interval to measure signal strengths on potential target carriers. The user equipment may hand off to another carrier if the measured signal strength satisfies a handover criterion such as exceeding a handover threshold. The load thresholds are assigned to the eNodeBs statically and do not take account of the quality sensitivity of the load. Consequently, the eNodeB may have difficulty maintaining the quality of experience for some user equipment as different user equipment imposes different demands on the eNodeBs.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for load balancing based on aggregate quality of service (QoS) thresholds. The method includes setting a load threshold for a first carrier of a base station based on QoS classes for applications using the first carrier. The method also includes performing load balancing between the first carrier and one or more additional carriers based on the load threshold.

In some embodiments, an apparatus is provided for load balancing based on aggregate QoS thresholds. The apparatus includes a processor configured to set a load threshold for a first carrier of a base station based on QoS classes for applications using the first carrier. Load balancing between the first carrier and one or more additional carriers is performed based on the load threshold.

In some embodiments, a non-transitory computer readable medium embodying a set of executable instructions is provided for load balancing based on aggregate QoS thresholds. The set of executable instructions is to manipulate the one or more processors to set a load threshold for a first carrier of a base station based on QoS classes for applications using the first carrier. The set of executable instructions is also to manipulate the one or more processors to perform load balancing between the first carrier and one or more additional carriers based on the load threshold.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
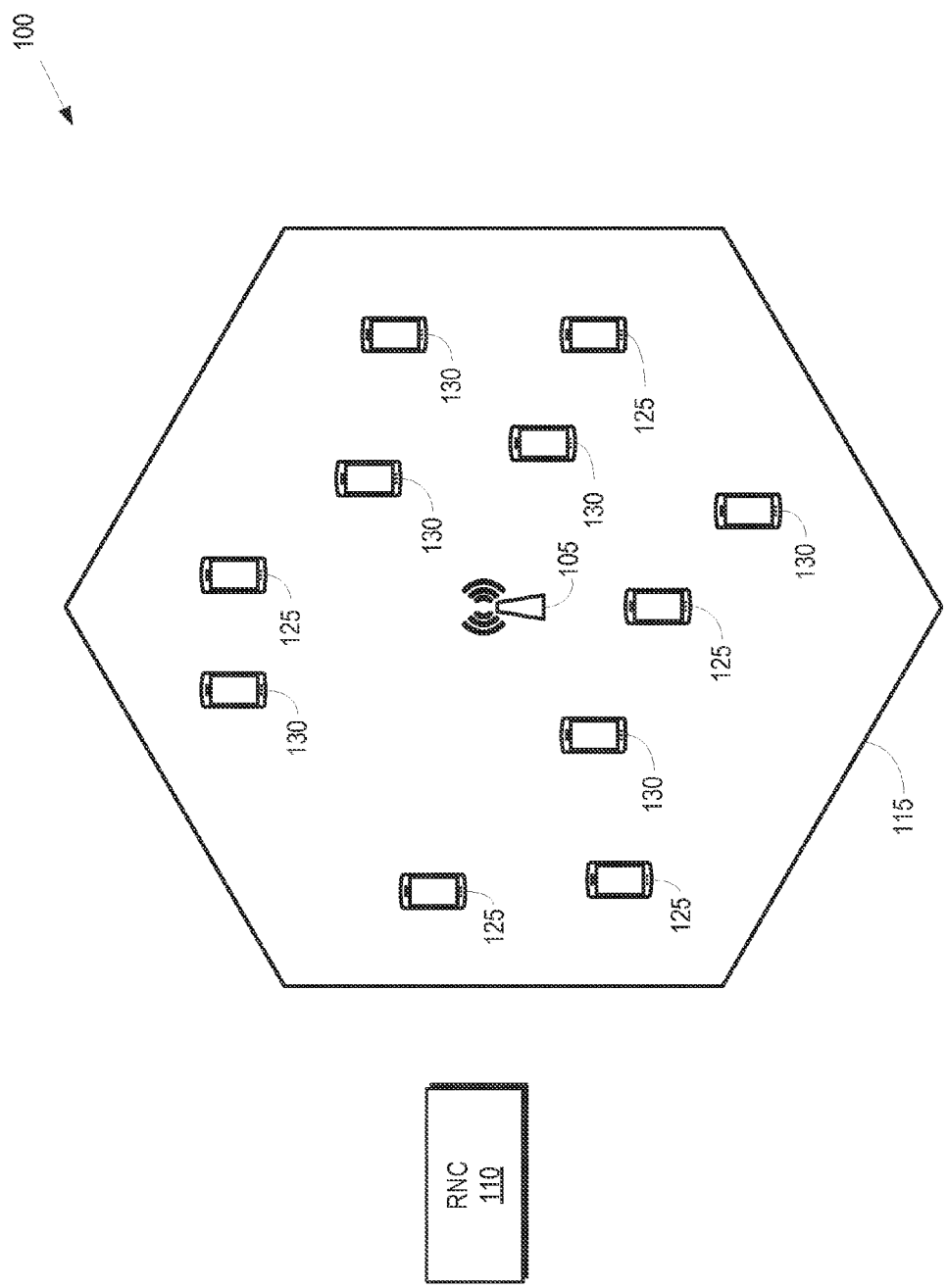
FIG. 1 is a diagram of an example of a wireless communication system according to some embodiments.

The quality of experience for user equipment associated with a heavily loaded carrier of a base station may be improved by setting a load threshold for handoff from the carrier based on quality of service (QoS) classes for applications using the carrier. The QoS classes may include classes corresponding to one or more levels of guaranteed bit rate service or one or more levels of best effort service. For example, the load thresholds for the base station may be decreased in response to the percentage of best effort applications increasing relative to the percentage of guaranteed bit rate applications. Best effort applications typically impose lower demands on the base station and so the load thresholds can be increased to allow more user equipment to access the base station when the proportion of best effort applications is relatively high. For another example, the load thresholds for the base station may be decreased in response to the percentage of high priority or guaranteed bit rate applications increasing relative to the percentage of best effort applications. High priority or guaranteed bit rate applications typically impose higher demands on the base station and so the load thresholds can be decreased to reduce the number of user equipment accessing the base station when the portion of guaranteed bit rate applications is relatively high.

In some embodiments, the load threshold of the base station may also be modified in response to changes in one or more key performance indicators (KPIs) such as a blocked call rate or a call drop rate. For example, the load thresholds may be decreased to encourage user equipment to move to other carriers in response to an observed increase (e.g., a measured increase or a received measurement indicating an increase) in the blocked call rate or the dropped call rate which would indicate the ability of the carrier to admit new calls or support existing calls. The load thresholds may also be adapted dynamically in response to variations the mix of applications and measured KPIs.

In some embodiments, the load thresholds may also be determined based on a comparison of characteristics of multiple base stations. For example, the load threshold for a first base station may be decreased, and the load threshold for a second base station may be increased, if the first base station (or a first carrier supported by the first base station) is operating near capacity while the second base station (or a second carrier supported by the second base station) is operating below capacity. For another example, load thresholds of macrocells and metrocells may be set to give priority to metrocells and encourage handoffs of user equipment to macrocells when the user equipment is out of reach of a metrocell or when mobility information (such as a speed, a velocity, or a cell reselection rate) for the user equipment indicates that the user equipment should be assigned to a macrocell. Thus, a low band macrocell could be considered "premium" bandwidth (especially in comparison to a high-band metrocell) and the wireless communication system would preferably serve a user with high-band/low reach/metro carriers first. The wireless can indication system would hand-off to the "premium" carrier only if required, e.g., because the user cannot be reached on the non-premium carrier or because the user may be better served by a macrocell because of the user's QoS class (such as guaranteed bit rate or high priority) and the users mobility state. Some embodiments may set thresholds based on any combination of the criteria or information described herein.

FIG. 1 is a diagram of an example of a wireless communication system 100 according to some embodiments. The wireless communication system 100 includes a base station 105 that provides wireless connectivity in corresponding geographic areas or cells 115, 120. As used herein, the term "base station" will be understood to refer to any device for providing wireless connectivity including eNodeBs, access points, access networks, access serving networks, cells, macrocells, metrocells, microcells, picocells, and the like. In addition to referring to a geographic area, the term "cell" may also be used to refer to the base station 105 that provides wireless connectivity within a geographic area that is also referred to as a cell, such as the cells 115, 120. The base station 105 may support one or more carriers (or carrier frequencies) and may operate according to standards such as the Long Term Evolution (LTE) standards or the Wideband Code Division Multiple Access (WCDMA) standards defined by the Third Generation Partnership Project (3GPP) or a successor technology such as 5G. The base station 105 may also be connected to a controller such as a radio network controller 110 that coordinates operation of the base station 105 with other base stations in the wireless communication system 100, e.g., by performing radio resource management or mobility management.

The wireless communication system 100 includes user equipment 125 that are using one or more applications to access the wireless communication system 100 via one or more carriers supported by the base station 105. The applications used by the user equipment 125 are receiving guaranteed bit rate service from the base station 105. As used herein, the term "guaranteed bit rate" refers to a quality of service (QoS) class that specifies an uplink or downlink bit rate that is guaranteed by the service provider to the user equipment 125 while using applications that are receiving the guaranteed bit rate. In some embodiments, a QoS class that guarantees a specific bit rate may also guarantee one or more of a maximum delay, jitter, packet dropping probability, bit error rate, and the like. A QoS class may also be referred to as a grade of service (GoS) class that guarantees one or more of a relative delivery priority, a bit rate, a delay, a jitter, a packet dropping probability, a bit error rate, and the like. Guaranteed bit rate, high Qos, or high GoS services may be used to support applications such as voice-over-Internet Protocol (VoIP), video teleconferencing, streaming audio or video, and the like.

The wireless communication system 100 also includes user equipment 130 that are receiving best effort service (over one or more carriers of the base station 105) for one or more applications that are used to access the wireless communication system 100. As used herein, the term "best effort" is used to indicate that the wireless communication system does not guarantee a bit rate, a delay, a jitter, a packet dropping probability, or a bit error rate. The term "best effort" may also be used to indicate that the wireless communication system assigns a low delivery priority relative to other traffic. Applications that are receiving best effort service receive a bit rate (as well as other characteristics of the transmission) that is not predetermined and typically varies. Some embodiments of best effort service may prioritize transmission of one packet over transmission of another so that best effort service may provide different QoS classes to different applications used by the user equipment 130. Best effort service may be used to support applications that are not sensitive to delays or latency such as email, web browsing, and the like.

Different classes of guaranteed bit rate or best effort service may be identified using a Quality of Service (QoS) Class Identifier (QCI). For example, the values 1-4 of the QCI may be used to indicate QoS classes that correspond to different guaranteed bit rates. The value 1 may indicate the highest guaranteed bit rate, the value 2 may indicate the next highest guaranteed bit rate, the value 3 may indicate the next highest guaranteed bit rate, and the value 4 may indicate the lowest guaranteed bit rate. The best effort services may be distinguished based on priority levels that indicate the relative priority of packets transmitted according to the different QoS classes of the best effort services. For example, the values 5-9 of the QCI may indicate decreasing levels of priority for best effort service from the value 5 to the value 9. Values of the QCI for applications used by user equipment 125, 130 may be stored by the base station 105 and used to schedule transmissions to the user equipment 125, 130.

Some embodiments of the base station 105 can measure parameters that indicate the load (or loads) on one or more carriers supported by the base station 105. For example, the base station 105 can determine the radio resource status for uplink transmissions or downlink transmissions by measuring the physical resource block (PRB) usage for the user equipment 125, 130. The base station 105 may measure the guaranteed bit rate PRB usage for the user equipment 125 that receive a guaranteed bit rate service provided by the base station 105. The base station 105 may also measure the PRB usage for non-guaranteed bit rate communication with one or more of the user equipment 130 or the total PRB usage of the user equipment 125, 130. Information indicative of the measured loads on carriers supported by the base station 105 may be exchanged between the base station 105 and one or more other base stations (not shown), e.g., via a backplane, backhaul network, or backhaul interface.

Load-balancing between carriers of the base station 105 (or carriers of other base stations not shown in FIG. 1) may be performed in response to the measured load on one or more carriers exceeding a load threshold. Load-balancing operations may be performed by the base station 105 or the radio network controller 110. In some embodiments of the wireless communication system 100, load-balancing operations may be performed by other entities such as eNodeBs or other controllers. The base station 105 or the radio network controller 110 may set load thresholds for one or more carriers based on the QoS classes for applications that are accessing the wireless communication system using carriers of the base station 105. In some embodiments, the thresholds may be set based on proportions of guaranteed bit rate applications in use by the user equipment 125 and best effort applications in use by the user equipment 130. For example, the base station 105 may set the load threshold as a function of the QCI values associated with the applications running on the user equipment 125, 130. The load threshold may also be a function of key performance indicators such as a blocked call rate or a dropped call rate. The base station 105 or the radio network controller 110 may modify one or more of the load thresholds in response to changes in the proportions of guaranteed bit rate applications and best effort applications that are using the carrier to access the wireless communication system 100. Some embodiments of the base station 105 or the radio network controller 110 may also modify one or more of the load threshold in response to changes in the key performance indicators such as the blocked call rate or the dropped call rate.

Figure 2:
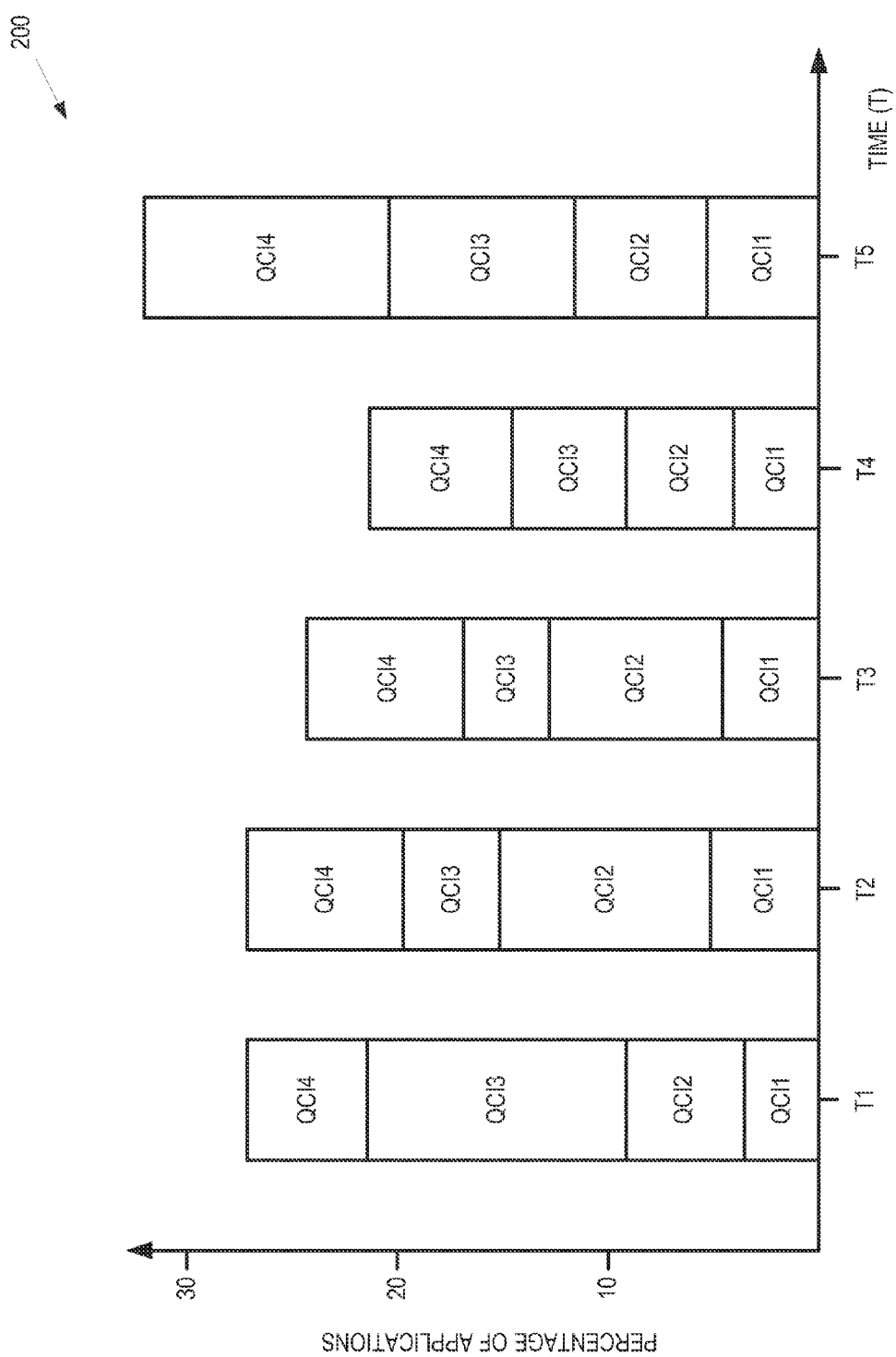
FIG. 2 is a diagram indicating percentages of applications utilizing a carrier of a base station at different QoS classes according to some embodiments.

FIG. 2 is a diagram 200 indicating percentages of guaranteed bit rate applications utilizing a carrier of a base station at different QoS classes according to some embodiments. The vertical axis indicates the percentage of applications in different QoS classes and the horizontal axis indicates time increasing from left to right. For example, the guaranteed bit rate applications may be in one of four QoS classes that are indicated by values QCI1, QCI2, QCI3, and QCI4, where the value QCI1 indicates the highest guaranteed bit rate, the value QCI2 indicates the next highest guaranteed bit rate, the value QCI3 indicates the next highest guaranteed bit rate, and the value QCI4 indicates the lowest guaranteed bit rate. In other embodiments, there may be more or fewer QoS guaranteed bit rate classes. The percentage of guaranteed bit rate applications in the different QoS classes may be determined using packet scheduling information for the QoS classes, measurements of PRB usage, deep packet inspection, or other techniques as discussed herein. Best effort classes are those classes other than guaranteed bit rate classes. The percentage of best effort applications using the carrier of the base station is the difference between the total percentage of guaranteed bit rate applications and 100%. However, in some embodiments, the percentage of best effort applications utilizing the carrier may be measured directly for the QoS classes associated with best effort communication on the carrier.

Figure 3:
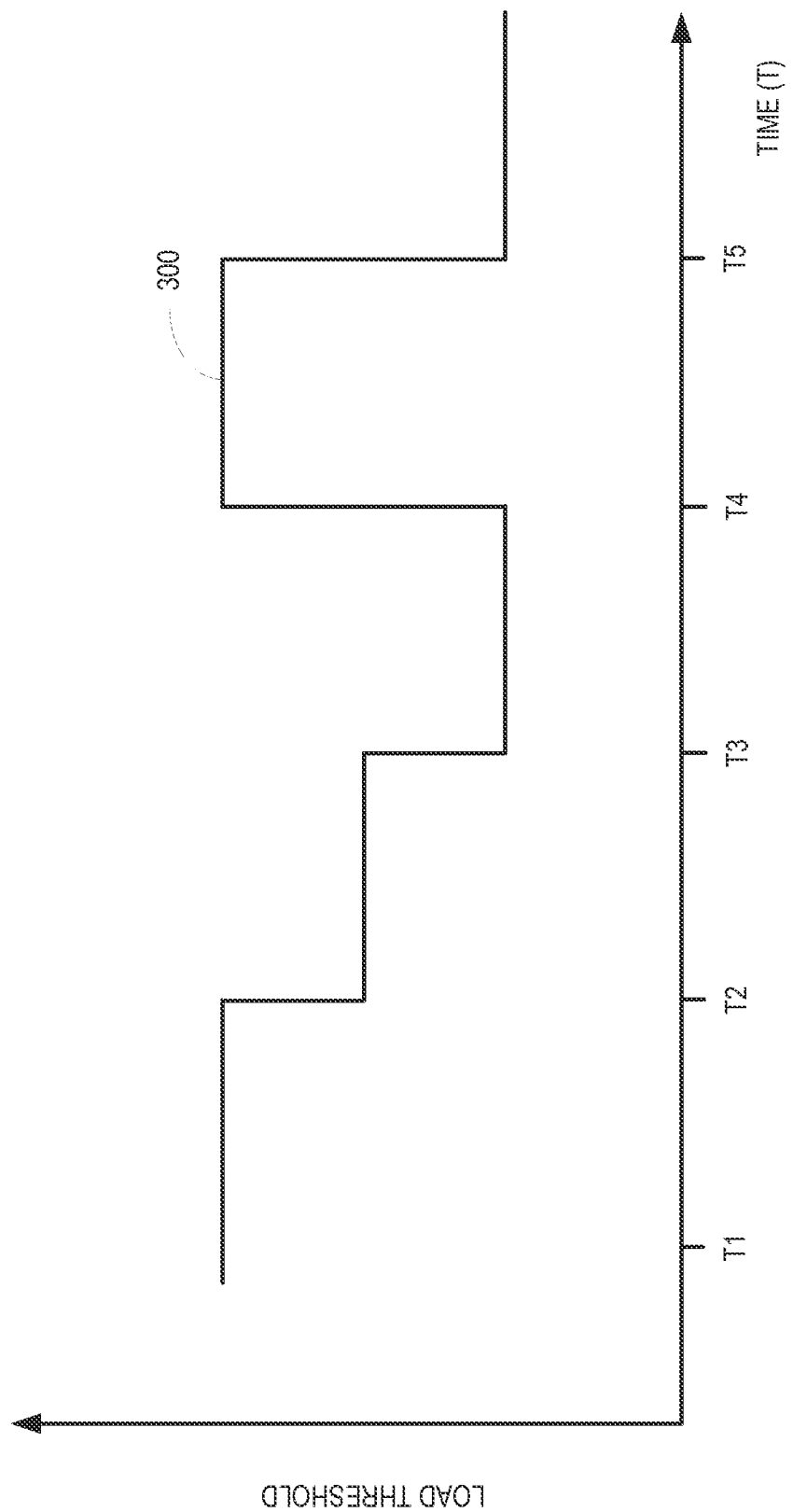
FIG. 3 is a diagram indicating values of a load threshold corresponding to the percentage of applications assigned a high priority within an aggregate load such as that illustrated in FIG. 2 according to some embodiments.

FIG. 3 is a diagram indicating values of a load threshold 300 corresponding to the percentage of guaranteed bit rate applications illustrated in FIG. 2 according to some embodiments. The vertical axis indicates the load threshold in arbitrary units and the horizontal axis indicates time increasing from left to right. The values of the load threshold 300 may be set by a base station or, in some embodiments, a radio network controller.

At T=T1, the percentage of applications using the carrier for guaranteed bit rate service in the QoS classes indicated by the values QCI1-QCI4 is approximately 27%, as indicated in FIG. 2. Consequently, the percentage of applications using the carrier for best effort service is approximately 73%. The proportions of guaranteed bit rate applications and best effort applications may therefore be represented by a ratio of the percentage of guaranteed bit rate applications to best effort applications, which is approximately 1:2.7 in this case. A base station (or, in some embodiments, a radio network controller) may calculate an aggregate QCI value based on the percentages of guaranteed bit rate applications in the QoS classes indicated by the values QCI1-QCI4. For example, the aggregate QCI value may be given by:

QCI aggregate=% at QCI1*weightQCI1+% at QCI2*weightQCI2+% at QCI3*weightQCI3+% at QCI4*weightQCI4.    (1)

However, in some embodiments the aggregate QCI value may be computed using the QCI values for both guaranteed bit rate and best effort applications. For example, the aggregate QCI value may be equal to a sum of the number of applications at each QCI value (or the percentage of flows at each QCI value or the percentage of bandwidth reserved by guaranteed bit rate bearers) which are weighted (weightQCI) based on the QCI value as indicated in equation (1).

The load threshold at T=T1 may then be computed as a function of the aggregate QCI value. Some embodiments may also compute the load threshold as a function of key performance indicators such as the blocked call rate or the dropped call rate. For example, the base station may compute the load threshold using:

$$\text{Threshold} = K * \left( w1 * QCI_{aggregate} + \frac{w2}{\text{block rate}} + \frac{w3}{\text{drop rate}} \right), \quad (2)$$

where K is a proportionality constant, w1 is a weight applied to the aggregate QCI value, w2 is a weight applied to the block rate, and w3 is a weight applied to the drop rate. The proportionality constant and the weights are configurable. For example, an operator may choose to give equal weights to the QCI aggregate, the block rate, and the drop rate. The constant of proportionality K may be used to normalize the threshold as a percentage of the load at which load balancing to other carriers is triggered. In some embodiments, the weights may be a non-linear function of the observed values. For example, the value of the drop rate may be considered insignificant (and may therefore not contribute to the threshold defined in equation (2)) if the measured KPI indicates that the drop rate is below a threshold. However, the value of the weight w3 may be increased (possibly as a function of the measured KPI) in response to the measured KPI indicating that the drop rate is above the threshold so that the drop rate strongly influences the threshold defined in equation (2). The load threshold (at T=T1) is determined based on the aggregate value, the blocked call rate, and the dropped call rate, as indicated in equation (2) and in FIG. 3.

At T=T2, the total percentage of applications using the carrier for guaranteed bit rate service remains approximately the same relative to the total percentage of guaranteed bit rate applications at T=T1, as indicated in FIG. 2. Assume that the blocked call rate and the dropped call rate remain stable from T1 to T2. However, the proportion of guaranteed bit rate applications receiving a relatively higher guaranteed bit rate (e.g., QCI1 and QCI2) has increased relative to the proportion of guaranteed bit rate applications receiving a relatively lower guaranteed bit rate (e.g., QCI3 and QCI4). Thus, the aggregate QCI value decreases relative to the aggregate QCI value at T=T1, as indicated in equation (1). The base station typically is able to support fewer applications at higher guaranteed bit rates and so the base station decreases the load threshold (as indicated in equation (2) and in FIG. 3) so that load-balancing to other carriers is triggered at lower measured values of the load on the carrier.

At T=T3, the total percentage of applications using the carrier for guaranteed bit rate service has decreased and thus the percentage of applications using the carrier for best effort service has increased, as indicated in FIG. 2. However, assume that the base station also measures an increase in a blocked call rate or a dropped call rate. The base station therefore decreases the load threshold as indicated in equation (2) and in FIG. 3. Decreasing the load threshold in response to an increase in a blocked call rate or a dropped call rate triggers load-balancing at lower threshold values to reduce the load on the carrier and potentially reduce the blocked call rate or the dropped call rate.

At T=T4, the total percentage of applications using the carrier for guaranteed bit rate service has decreased and thus the percentage of applications using the carrier for best effort service has increased, as indicated in FIG. 2. The aggregate QCI value therefore decreases as indicated by equation (1). The base station can typically support larger percentages of best effort applications (relative to guaranteed bit rate applications) and so the base station can support more applications when the proportion of guaranteed bit rate applications relative to the proportion of best effort applications decreases. Also assume that the blocked call rate and the dropped call rate have also decreased. Consequently the base station increases the load threshold as indicated by equation (2) and FIG. 3. Increasing the load threshold in response to the change in the proportions of guaranteed bit rate applications and best effort bit rate applications, as well as the decrease in the key performance indicators, allows the base station to support more applications before triggering load-balancing.

At T=T5, the total percentage of applications using the carrier for guaranteed bit rate service has increased and thus the percentage of applications using the carrier for best effort service has decreased, as indicated FIG. 2. The aggregate QCI value therefore increases as indicated by equation (1). The base station can typically support smaller percentages of guaranteed bit rate applications (relative to best effort applications) and so the base station can support fewer applications when the proportion of guaranteed bit rate applications relative to the proportion of best effort applications increases. The base station therefore decreases the load threshold as indicated by equation (2) and in FIG. 3. Generally, decreasing the load threshold in response to the change in the proportions of guaranteed bit rate applications and best effort bit rate applications encourages load-balancing to other carriers. Nevertheless, note that changes in the blocked call rate and the dropped call rate can also impact the calculation of the load threshold.

In some embodiments, a smoothing function may be applied to the load threshold 300. For example, the load threshold 300 may be determined using a moving average or exponential smoothing in order to reduce period-to-period changes in the load threshold 300. Applying a smoothing function to the load threshold 300 may reduce the likelihood of undesirable side effects. For example, smoothing the load threshold 300 may reduce the likelihood of shifting an unnecessarily large proportion of traffic to other carrier, and thus leaving the original carrier underutilized, in response to short duration peaks in high QCI load.

Figure 4:
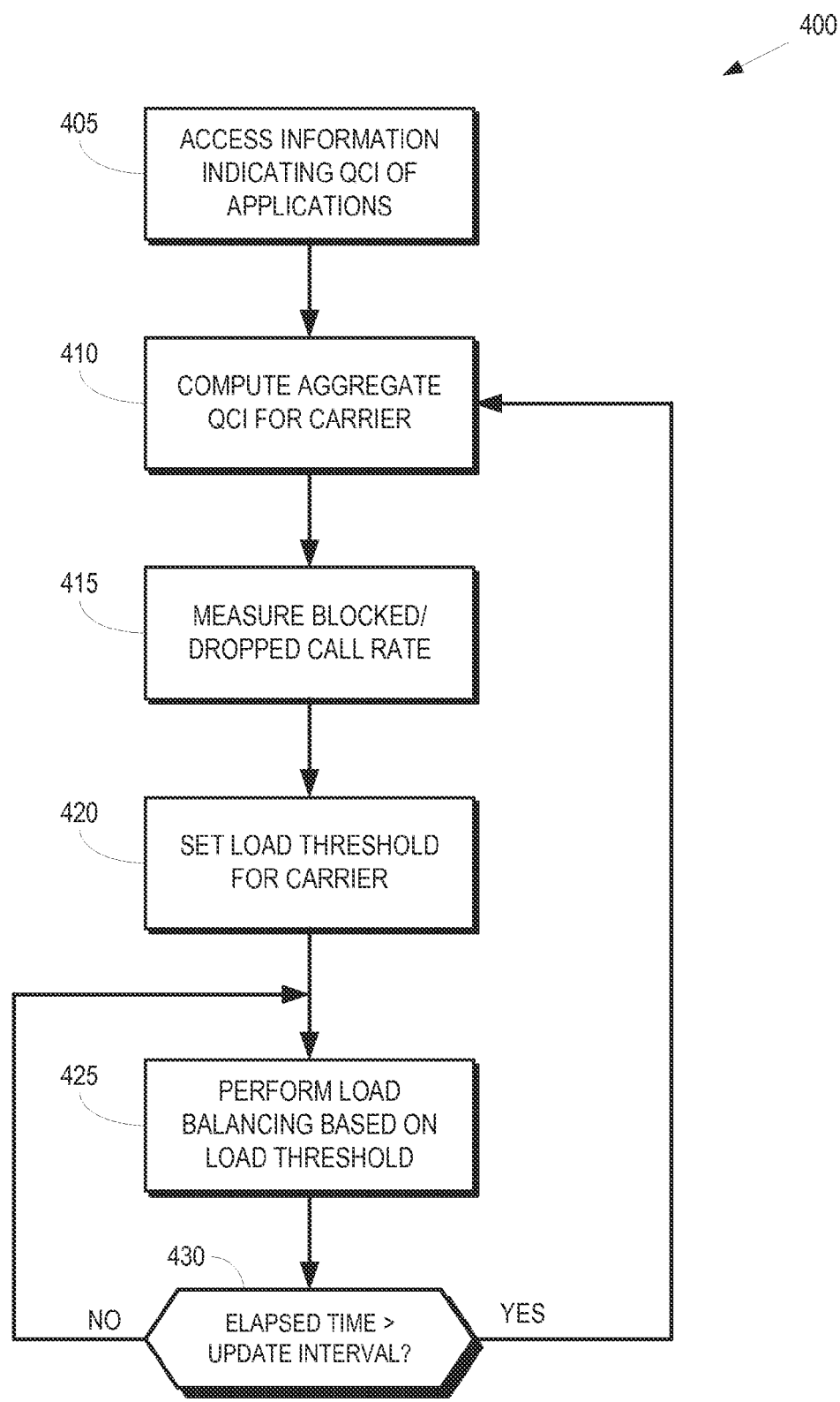
FIG. 4 is a flow diagram of a method for setting load thresholds and performing load balancing based on the load thresholds according to some embodiments.

FIG. 4 is a flow diagram of a method 400 for setting load thresholds and performing load balancing based on the load thresholds according to some embodiments. The method 400 may be implemented in some embodiments of the base station 105 or the radio network controller 110 shown in FIG. 1. At block 405, a network entity such as a base station accesses information indicating QCI values for applications that are utilizing a carrier supported by the base station. For example, the base station may store the QCI values in memory and update the QCI values in response to changes in the QoS classes of applications using the carrier. At block 410, the base station computes an aggregate value of the QCIs for the applications, as discussed herein. In some embodiments, the base station also measures key performance indicators such as a blocked call rate or a dropped call rate at block 415. At block 420, the base station sets a load threshold for the carrier as a function of at least one of the aggregate QCI value, the blocked call rate, the dropped call rate, or other measured key performance indicators, e.g., using equations (1) and (2) as discussed herein. The base station then performs load balancing for the carrier based on the load threshold at block 425. For example, the base station may load balance some user equipment or applications from the carrier to another carrier if the load on the carrier exceeds the load threshold.

In some embodiments, load thresholds may be updated or modified periodically or after a predetermined update interval or from time to time. The update interval may be configured or modified by an operator of the base station or wireless communication system and may vary from time to time (e.g., a different update interval may be utilized at different times of a day). At decision block 430, the base station determines whether the elapsed time since a previous update of the load thresholds is greater than the update interval. If not, the base station continues to perform load balancing based on the load threshold at block 425. If the elapsed time since the previous update of the load thresholds is greater than the update interval, the base station may compute a new value of the aggregate QCI at block 410, perform new measurements of the key performance indicators at block 415, and set new load thresholds for the carrier at block 420. The base station may then perform load balancing based on the modified load thresholds at block 425. The method 400 may be iterated as long as the base station is in operation.

Some embodiments of wireless communication systems, such as the wireless communication system 100 shown in FIG. 1, include multiple base stations that may implement embodiments of the method 400. The multiple base stations may support multiple carriers and handoff functions between the base stations or carriers may be managed autonomously using different instantiations of embodiments of the method 400. However, delays or latency between the multiple base stations may result in an oscillatory effect in which load is shifted from one set of base stations to another set of base stations and then back again in each iteration of the method 400 that is performed autonomously by the multiple base stations. Determination of the load thresholds at different base stations may therefore be coordinated by setting the threshold based on one or more characteristics of other base stations in the wireless communication system. For example, the wireless communication system may identify sets of carriers that may be affected by load-balancing associated with other carriers within the set. An entity in the wireless communication system, such as the radio network controller 110 shown in FIG. 1, may distribute schedules to the base stations that identify time intervals in which the base stations are allowed to make load threshold adjustments and a guard time interval during which the base stations are not allowed to make load threshold adjustments. The duration of the guard time interval may be set to allow loads on the base stations to stabilize before a subsequent modification of the load thresholds. Some embodiments of the base stations may also apply a smoothing function to the load thresholds, as described herein.

Figure 5:
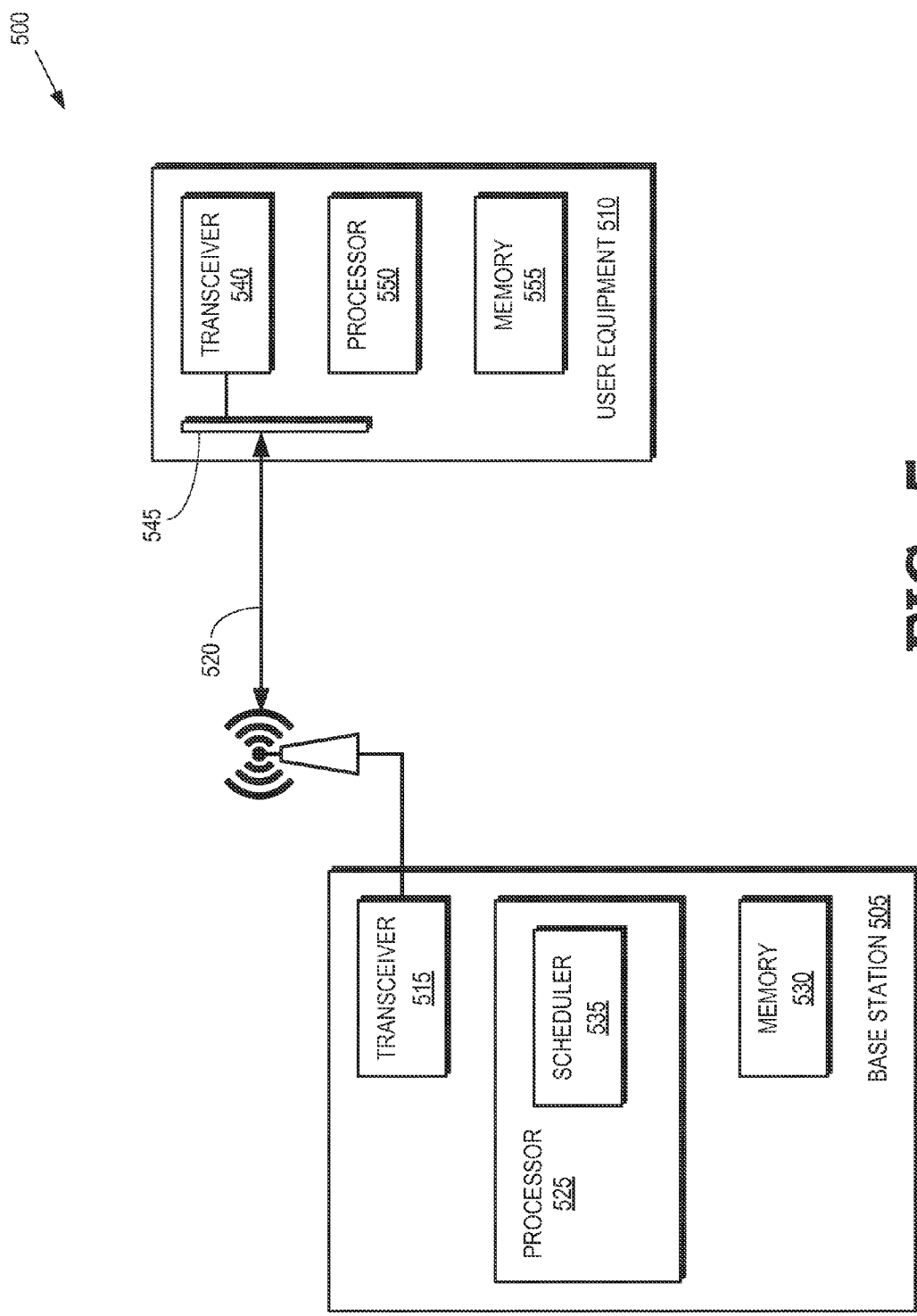
FIG. 5 is a block diagram of an example of a wireless communication system according to some embodiments.

FIG. 5 is a block diagram of an example of a wireless communication system 500 according to some embodiments. The wireless communication system 500 includes a base station 505 and user equipment 510. Some embodiments of the base station 505 and the user equipment 510 may be used to implement respectively the base station 105 and the user equipment 125, 130 shown in FIG. 1.

The base station 505 includes a transceiver 515 for transmitting or receiving messages, such as messages transmitted to the user equipment 510 over an air interface 520. The transceiver 515 may support wired or wireless communication. The base station 505 also includes a processor 525 and a memory 530. The processor 525 may be used to execute instructions stored in the memory 530 and to store information in the memory 530 such as the results of the executed instructions. The processor 525 may also include a scheduler 535 for scheduling applications (which may be implemented in the user equipment 510) on one or more carriers supported by the base station 505.

Some embodiments of the transceiver 515, the processor 525, the memory 530, or the scheduler 535 may be used to implement embodiments of the techniques described herein including the method 400 shown in FIG. 4. For example, the processor 525 or the scheduler 535 may be used to schedule packets for applications according to QoS classes associated with the applications and may perform load balancing based on the load thresholds, as discussed herein. Information indicating the percentages of resources used by packets in different QoS classes and (optionally) best effort packets may be stored in the memory 530. Scheduling or load-balancing may be performed based on instructions and other information stored in the memory 530, which may also store the load thresholds.

The user equipment 510 includes a transceiver 540 that is coupled to an antenna 545 for transmitting or receiving messages over the air interface 520, such as messages transmitted by the base station 505. The transceiver 540 may support wired or wireless communication. The user equipment 510 also includes a processor 550 and a memory 555. The processor 550 may be used to execute instructions stored in the memory 555 and to store information in the memory 555 such as the results of the executed instructions. Some embodiments of the transceiver 540, the processor 550, or the memory 555 may be used to implement embodiments of the techniques described herein including the method 400 shown in FIG. 4. For example, the transceiver 540 may receive messages instructing the user equipment 510 to perform measurements of other carriers as part of a load-balancing procedure. The messages or the measurement results may be stored in the memory 555.

In some embodiments that may be implemented in combination with other embodiments discussed herein, load thresholds may be set based on application types or other performance metrics. For example, streaming video applications may be relatively insensitive to latency but may operate more effectively if allocated a certain average throughput in a time interval corresponding to the depth of a video buffer implemented in user equipment. The streaming video application may utilize best effort service and may not be assigned a QCI of 1-4 or a guaranteed bit rate bearer. However, the streaming video application may benefit from a "better-than-best-effort" treatment, which may be provided by lowering a load threshold for the streaming video application's carrier in some cases. For example, if the carrier is being used by a mix of applications that contain a high proportion of streaming video QCI tagged traffic and the average aggregate throughput of the carrier is low, the base station may reduce the load threshold of the carrier to off-load traffic to an alternate carrier that is lightly loaded or carrying performance insensitive traffic such as ftp downloads.

Load thresholds may also be set based on contents of the packets being transmitted over the carrier. In some embodiments, deep packet inspection for signatures and behavior at the core of the network may be used to set quality indicators that can be mapped to QCIs. Operators may then flexibly assign traffic to carriers to trigger load balancing as described herein. For example, in addition to application type, priority could be assigned based on the source or destination of a packet so that a carrier with many 'high priority' subscribers starts offloading traffic to other carriers at a lower threshold than a carrier containing low priority subscribers.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
setting a load threshold for a first carrier of a base station based on at least one key performance indicator of the first carrier and relative numbers of applications using the first carrier to access a wireless communication system at different quality of service (QoS) classes, wherein setting the load threshold for the first carrier based on QoS classes for the applications using the first carrier comprises increasing the load threshold in response to a percentage of best effort applications using the first carrier increasing relative to a percentage of guaranteed bit rate applications using the first carrier and decreasing the load threshold in response to a percentage of guaranteed bit rate applications using the first carrier increasing relative to a percentage of best effort applications using the first carrier; and
performing load balancing between the first carrier and at least one second carrier based on the load threshold.

2. The method of claim 1, wherein setting the load threshold for the first carrier of the base station comprises setting the load threshold for the first carrier of the base station based on at least one characteristic of a second base station.

3. The method of claim 1, further comprising:
determining an aggregate value based on percentages of applications using the first carrier associated with indicators of QoS classes for at least one of high-priority applications, guaranteed bit rate applications, and best effort applications.

4. The method of claim 3, wherein setting the load threshold for the first carrier based on QoS classes for the applications using the first carrier comprises setting the load threshold for the first carrier based on the aggregate value.

5. The method of claim 1, wherein setting the load threshold based on the at least one key performance indicator comprises setting the load threshold based on at least one of a blocked call rate for the first carrier and a call drop rate for the first carrier.

6. The method of claim 5, wherein setting the load threshold comprises decreasing the load threshold in response to an increase in at least one of the blocked call rate for the first carrier and the call drop rate for the first carrier.

7. The method of claim 1, wherein setting the load threshold comprises setting the load threshold at the base station or at a controller.

8. An apparatus comprising:
a processor configured to set a load threshold for a first carrier of a base station based on at least one key performance indicator of the first carrier and relative numbers of applications using the first carrier to access a wireless communication system at different quality of service (QoS) classes, wherein load balancing between the first carrier and at least one second carrier is performed based on the load threshold, wherein the processor is configured to increase the load threshold in response to a percentage of best effort applications using the first carrier increasing relative to a percentage of guaranteed bit rate applications using the first carrier and to decrease the load threshold in response to a percentage of guaranteed bit rate applications using the first carrier increasing relative to a percentage of best effort applications using the first carrier.

9. The apparatus of claim 8, wherein the processor is configured to set the load threshold for the first carrier of the base station based on at least one characteristic of a second base station.

10. The apparatus of claim 8, wherein the processor is configured to determine an aggregate value based on percentages of applications using the first carrier associated with indicators of QoS classes for at least one of guaranteed bit rate service and best effort service.

11. The apparatus of claim 10, wherein the processor is configured to set the load threshold for the first carrier based on the aggregate value.

12. The apparatus of claim 8, wherein the processor is configured to set the load threshold for the first carrier based on at least one of a blocked call rate for the first carrier and a call drop rate for the first carrier.

13. The apparatus of claim 12, wherein the processor is configured to decrease the load threshold for the first carrier in response to an increase in at least one of the blocked call rate for the first carrier and the call drop rate for the first carrier.

14. The apparatus of claim 8, wherein the processor is implemented in at least one of the base station and a radio network controller.

15. A non-transitory computer-readable medium embodying a set of instructions which when executed by a processor configure the processor to perform a method, the method comprising:
setting a load threshold for a first carrier of a base station based on at least one key performance indicator of the first carrier and relative numbers of applications using the first carrier to access a wireless communication system at different quality of service (QoS) classes, wherein setting the load threshold for the first carrier based on QoS classes for the applications using the first carrier comprises increasing the load threshold in response to a percentage of best effort applications using the first carrier increasing relative to a percentage of guaranteed bit rate applications using the first carrier and decreasing the load threshold in response to a percentage of guaranteed bit rate applications using the first carrier increasing relative to a percentage of best effort applications using the first carrier; and
performing load balancing between the first carrier and at least one second carrier based on the load threshold.

16. The method of claim 1, wherein setting the load threshold for the first carrier comprises setting the load threshold for the first carrier based on at least one ratio of the relative numbers of applications using the first carrier to access the wireless communication system at the different QoS classes.

17. The method of claim 16, wherein setting the load threshold for the first carrier comprises setting the load threshold for the first carrier based on a ratio of the number of guaranteed bit rate applications using the first carrier to the number of best effort applications using the first carrier.

18. The apparatus of claim 8, wherein the processor is configured to set the load threshold for the first carrier based on at least one ratio of the relative numbers of applications using the first carrier to access the wireless communication system at the different QoS classes.

19. The apparatus of claim 18, wherein the processor is configured to set the load threshold for the first carrier based on a ratio of the number of guaranteed bit rate applications using the first carrier to the number of best effort applications using the first carrier.

* * * * *